United States Patent

Ferris

[15] 3,661,610
[45] May 9, 1972

[54] PIGMENT

[72] Inventor: Andrew Paul Ferris, Cornwall, England

[73] Assignee: English Clays Lovering Pochin & Company Limited, Cornwall, England

[22] Filed: Sept. 8, 1970

[21] Appl. No.: 70,104

[30] Foreign Application Priority Data

Sept. 10, 1969  Great Britain......................44,700/69

[52] U.S. Cl. ...................106/306, 106/288 B, 106/308 B, 106/308 Q, 106/309
[51] Int. Cl.............................................C09c 1/02, C09c 1/28
[58] Field of Search.....................106/72, 288 B, 306, 308 B, 106/308 Q, 309

[56] References Cited

UNITED STATES PATENTS

| 3,085,894 | 4/1963 | Rowland.................................106/306 |
| 2,540,182 | 2/1951 | Albert..................................106/308 B |
| 3,130,063 | 4/1964 | Millman et al. ....................106/288 B |

*Primary Examiner*—James E. Poer
*Attorney*—Cushman, Darby & Cushman

[57] ABSTRACT

A mixed clay/calcium carbonate pigment wherein the clay pigment component has associated therewith before being mixed with the calcium carbonate pigment component a water-soluble condensed phosphate dispersing agent and a second dispersing agent which is a water-soluble salt comprising an organic macromolecular anion, for example a salt of polyacrylic or polymethacrylic acid, and wherein the calcium carbonate pigment component has associated therewith before being mixed with the clay pigment component said second dispersing agent.

16 Claims, 1 Drawing Figure

PATENTED MAY 9 1972 3,661,610
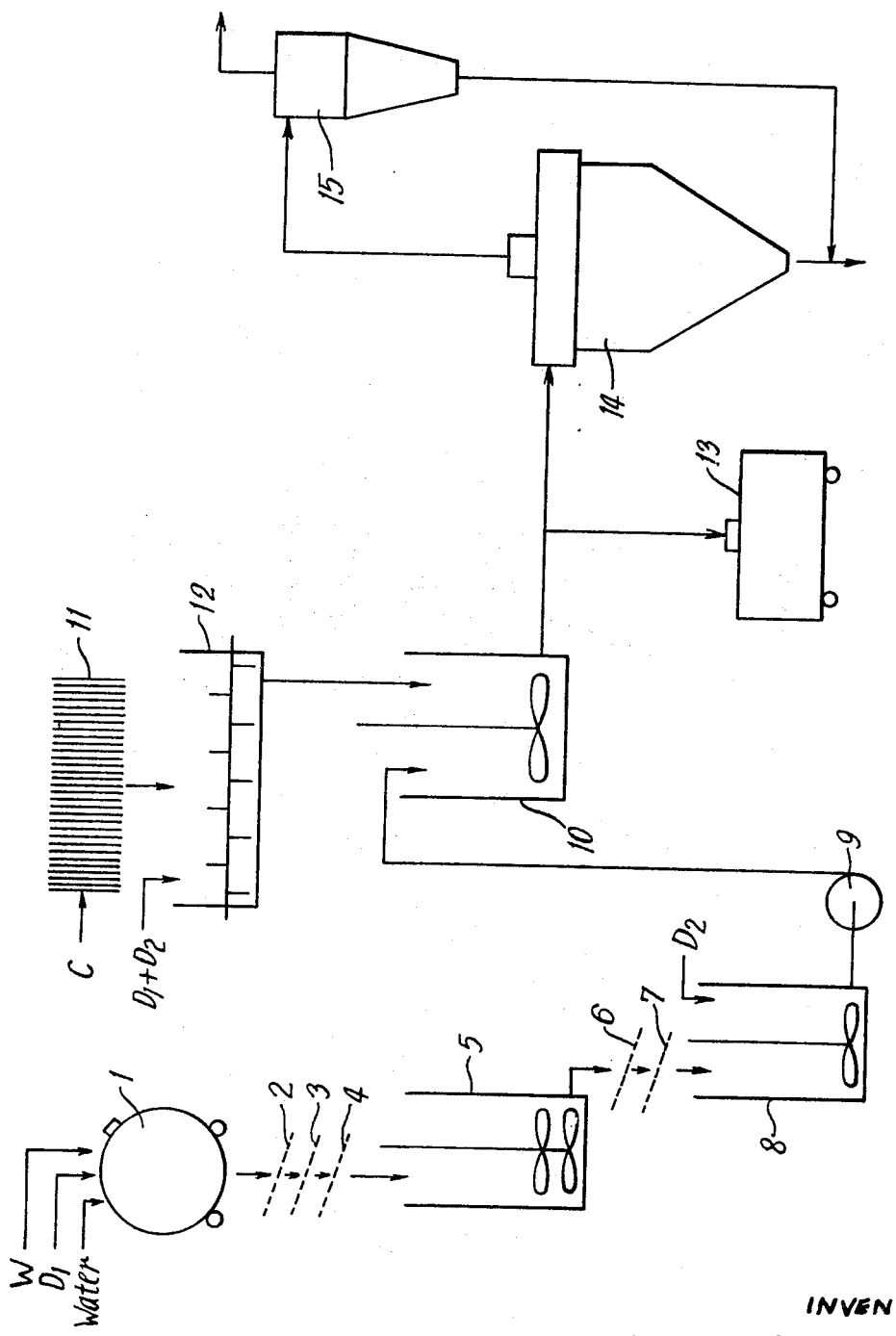
INVENTOR
ANDREW PAUL FERRIS
BY
Cushman, Darby & Cushman
ATTORNEYS

PIGMENT

BACKGROUND OF THE INVENTION

This invention relates to pigments and, more particularly, is concerned with a mixed pigment suitable for use in, for example, paper coating compositions, paints, rubbers and plastics materials.

It is known to produce a deflocculated aqueous suspension of a clay pigment, for example a kaolinitic clay, and to spray-dry the deflocculated aqueous suspension of clay pigment in order to obtain small spherical particles of the pigment which are free-flowing and are easy to redisperse in water for incorporation in, for example, a paper coating composition, such a material being known as a predispersed pigment. The dispersing agents generally used for forming the deflocculated aqueous suspension of clay pigment are water-soluble condensed phosphates, for example tetrasodium pyrophosphate, sodium hexametaphosphate and sodium tripolyphosphate. It is also known to treat a calcium carbonate pigment, for example chalk whiting, in a similar manner but using as the dispersing agent a water-soluble salt comprising an organic macromolecular anion, for example a sodium polyacrylate or a sodium polymethacrylate, a sodium salt of a sulphonated naphthalene-formaldehyde condensation product or a sodium lignosulphonate.

It is also known to prepare a mixture of a kaolinitic clay pigment and a calcium carbonate pigment, the mixed pigment thus obtained combining the good optical properties of the kaolinitic clay pigment with the good rheological properties of the calcium carbonate pigment. It is found, however, that if aqueous suspensions of the two components of the mixed pigment are deflocculated in a conventional manner, i.e. the kaolinitic clay pigment with a water-soluble condensed phosphate dispersing agent and the calcium carbonate pigment with a dispersing agent which is a water-soluble salt comprising an organic macromolecular anion, such as a sodium polyacrylate or a sodium polymethacrylate, and the two aqueous suspensions then blended together, there is obtained a deflocculated suspension of the mixed pigment the rheological properties of which deteriorate seriously on storage. This means that heretofore a paper manufacturer, for example, has had to prepare the mixed pigment as and when required, and has not been able to obtain a suitable stable suspension of a mixed pigment or a predispersed mixed pigment from a pigment manufacturer.

It is an object of the present invention to provide a mixed pigment which forms a stable suspension.

SUMMARY OF THE INVENTION

According to one aspect of the present invention there is provided a mixed pigment comprising a clay pigment component and a calcium carbonate pigment component, wherein the clay pigment component has associated therewith before being mixed with said calcium carbonate pigment component a quantity of a first dispersing agent which is a water-soluble condensed phosphate and a quantity of a second dispersing agent which is a water-soluble salt comprising an organic macromolecular anion, and wherein the calcium carbonate pigment component has associated therewith before being mixed with said clay pigment component a quantity of said second dispersing agent.

According to another aspect of the invention there is provided a method of preparing a mixed pigment which method comprises the steps of (a) forming an aqueous suspension of a clay pigment containing a quantity of a first dispersing agent which is a water-soluble condensed phosphate and a quantity of a second dispersing agent which is water-soluble salt comprising an organic macromolecular anion, (b) forming an aqueous suspension of a calcium carbonate pigment containing a quantity of said second dispersing agent, and (c) blending together the aqueous suspensions of the clay pigment and of the calcium carbonate pigment.

In one embodiment of the method according to the invention, the blended suspension is then dried, for example by means of a spray drier, a drum drier or a fluidized bed drier, to form a predispersed mixed pigment. An alternative method of obtaining a predispersed mixed pigment is to dry the aqueous suspensions of the clay pigment and of the calcium carbonate pigment separately, and then blend together the dried pigment components.

DESCRIPTION OF THE PREFERRED EMBODIMENTS

Preferably, the calcium carbonate pigment component also has associated therewith before being mixed with said clay pigment component a quantity of said first dispersing agent.

The first dispersing agent is a water-soluble condensed phosphate and can be, for example, tetrasodium pyrophosphate, sodium hexametaphosphate or sodium tripolyphosphate.

The second dispersing agent is a water-soluble salt comprising an organic macromolecular anion which preferably has a number average molecular weight in the range 100 to 10,000. The organic macromolecular anion can be polymeric and examples of suitable water-soluble salts of this type include sodium, potassium or ammonium salts of polyacrylic acids or of polymethacrylic acids, and sodium salts of the sulphonated condensation products of naphthalene and formaldehyde. Other water-soluble salts having organic macromolecular anions with a number average molecular weight in the range 100 to 10,000 which can be used include water-soluble salts of lignosulphonic acid.

The first and second dispersing agents used with each pigment component can be the same or different.

The amount of the first dispersing agent, viz. the water-soluble condensed phosphate, associated with the clay pigment component is preferably in the range of from 0.1 to 0.5 percent by weight, most preferably in the range of from 0.15 to 0.40 percent by weight, based on the weight of dry clay pigment, and the amount of the second dispersing agent, viz. the water-soluble salt comprising an organic macromolecular anion, associated with the clay pigment component is preferably in the range from 0.01 to 0.30 percent by weight, most preferably in the range from 0.02 to 0.20 percent by weight, based on the weight of dry clay pigment.

The amount, if any, of the first dispersing agent, viz. the water-soluble condensed phosphate associated with the calcium carbonate pigment is preferably in the range of from 0.02 to 0.30 percent by weight, most preferably in the range from 0.05 to 0.20 percent by weight, based on the weight of dry calcium carbonate pigment, and the amount of the second dispersing agent, viz. the water-soluble salt comprising an organic macromolecular anion, associated with the calcium carbonate pigment is preferably in the range from 0.01 to 0.30 percent by weight, most preferably in the range from 0.02 to 0.20 percent by weight, based on the weight of dry calcium carbonate.

The calcium carbonate pigment can be a natural chalk whiting, ground marble or calcite, or a chemically-precipitated calcium carbonate pigment, and should generally consist substantially completely of particles passing a No. 300 mesh B.S. sieve. Advantageously, there is used a natural chalk whiting in which case it is preferably ground until it has a particle size distribution such that at least 65 percent by weight thereof consists of particles smaller than 2 microns equivalent spherical diameter, not more than 10 percent by weight thereof should consist of particles larger than 10 microns equivalent spherical diameter, and not more than 1 percent by weight thereof consists of particles larger than 53 microns. The grinding of the natural chalk whiting can conveniently be performed in two stages: in the first stage it is subjected to a light grinding in a pebble mill, for a period of about 10–30 minutes, in the presence of water containing a quantity of the second dispersing agent in order to separate the hard impurities, e.g. flint, from the fluid suspension, the pebbles used in this first stage advantageously having sizes which are in the range of from 10 to 100 mm.; and in the second stage the grinding is completed in the presence of the second dispersing agent in a second pebble mill containing a particulate grinding medium consisting of particles having sizes in the range of from No. 100 mesh B.S. sieve to 15 mm. for a time sufficient to reduce the chalk whiting to the desired particle size distribution. The first and, if necessary, a further amount of the second dispersing agent can then be added with stirring to the aqueous suspension of ground chalk whiting.

The clay pigment is advantageously a kaolinitic clay, for example a kaolin, sometimes known as china clay. Other clay pigments which can be used include halloysite, dickite and nacrite. The clay pigment should preferably have a particle size distribution such that at least 50 percent by weight thereof consists of particles smaller than 2 microns equivalent spherical diameter, not more than 15 percent by weight thereof consists of particles larger than 10 microns equivalent spherical diameter, and not more than 0.05 percent by weight thereof consists of particles larger than 53 microns. A suspension suitable for mixing with the calcium carbonate pigment suspension can be prepared by first dewatering the clay and then mixing the cake thus obtained with an aqueous solution containing the required amount of the first and second dispersing agents in a liquid mixer, e.g. a blunger. The clay suspension can be dewatered by pressure filtering, for example in a tube pressure filter of the type disclosed in Belgian Pat. specification No. 717,264 or in recessed plate filter press, or by means of a vacuum filter or a centrifuge.

The suspension of clay pigment can be blended with the suspension of calcium carbonate pigment in a mixing vessel, for example an impeller mixer. The order of addition of the two components to the mixing vessel is not important.

The blended aqueous suspension of the mixed pigment, which advantageously comprises from 60 to 80 percent by weight of solids, can be transported as a stable slurry in suitable containers, or it can be dried in, for example, a spray drier in order to form a substantially dry material, i.e. a predispersed mixed pigment, which can be readily redispersed in water.

In the case of the predispersed mixed pigment, it has been found that in order to achieve the lowest viscosity and the greatest rheological stability on storage of the redispersed mixed pigment it is advantageous to add, when redispersing the dry mixed pigment, further small quantities of the first dispersing agent and of the second dispersing agent. The amount of the first dispersing agent added at this stage is preferably in the range of from 0.03 to 0.06 percent by weight, based on the total weight of dry solids in the mixed pigment, and the amount of the second dispersing agent added at this stage is preferably in the range 0.02 to 0.04 percent by weight, based on the total weight of dry solids. It has also been found that the amounts of first and second dispersing agents added to the mixed pigment when redispersing the same are preferably such that they are in the proportions of about 3 parts by weight of the first dispersing agent to about 2 parts by weight of the second dispersing agent.

For a better understanding of the invention, and to show how the same may be carried into effect, reference will now be made, by way of example, to the accompanying drawing which shows one arrangement of an installation suitable for carrying out the invention.

Referring to the drawing, raw natural chalk whiting (W), a sodium polyacrylate dispersing agent ($D_1$), and water are introduced into a pebble mill 1 containing pebbles ranging in size from 50 to 100 mm. The mixture is ground for 15 minutes so that the particles of chalk whiting pass into suspension leaving the hard impurities, e.g. flint. The suspension is then passed through a series of three sieves 2, 3 and 4, of which sieve 2 has a nominal aperture of ¼ inch, sieve 3 is a No. 10 mesh B.S. sieve and sieve 4 is a No. 60 mesh B.S. sieve. The screened suspension of chalk whiting is then further ground in a sand grinding mill 5 with a grinding medium consisting of quartz granules ranging in size from No. 30 mesh B.S. sieve (500 microns) To No. 10 mesh B.S. sieve (1.68 mm.) for a time sufficient to give a chalk whiting having a particle size distribution such that 80 percent by weight of the chalk whiting consists of particles smaller than 2 microns equivalent spherical diameter. The ground suspension is then passed through two further sieves 6 and 7 of which sieve 6 is a No. 100 mesh B.S. sieve and sieve 7 a No. 300 mesh B.S. sieve to a mixing vessel 8 in which the required proportion of tetrasodium pyrophosphate dispersing agent ($D_2$) is added. The fully deflocculated aqueous suspension of chalk whiting is transferred, by means of a pump 9, to a second mixing vessel 10 in which it is blended with a fully deflocculated suspension of a kaolin clay.

The deflocculated suspension of kaolin clay is formed by dewatering a suspension of a fine kaolin clay (C) having a particle size distribution such that at least 50 percent by weight thereof consists of particles smaller than 2 microns equivalent spherical diameter and not more than 0.05 percent by weight thereof consists of particles larger than 53 microns, in a recessed plate filter-press 11 to form a filter cake containing 27 percent to 30 percent by weight of water. This filter cake is mixed in a blunger 12 with an aqueous solution of the required quantities of sodium polyacrylate ($D_1$) and tetrasodium pyrophosphate ($D_2$) and the resultant fully deflocculated suspension of kaolin clay is mixed with the chalk whiting suspension in the mixing vessel 10.

The blended suspension of mixed pigment can either be transferred to tanker vehicles 13, for transport as a stable suspension, or dried in a spray-drier 14. In the latter case, the gas leaving the spray-drier 14 is passed through a cyclone 15 in order to separate from it entrained solid particles which are added to the dry product from the spray-drier. The gas leaving the cyclone is finally passed through a bag filter (not shown) before being exhausted to atmosphere.

The invention is further illustrated by the following examples.

EXAMPLES 1

45.4 kg of raw natural chalk whiting were loaded into a pebble mill containing, as grinding medium, pebbles ranging in size from 10 to 35 mm. together with 2.27 liters of an aqueous dispersing agent which is a sodium salt of a polyacrylic acid having a number average molecular weight of 1,650, the quantity of the dispersing atent added being 0.1 percent by weight based on the weight of dry chalk whiting. The raw natural chalk whiting contained 20 percent by weight of water and the solids content of the mixture in the pebble mill was therefore 76 percent by weight. The mixture was ground for a total time of 18 hours after which the aqueous suspension was screened successively through a No. 60 mesh B.S. sieve, a No. 100 mesh B.S. sieve, and a No. 300 mesh B.S. sieve. The ground chalk whiting passing the last sieve was found to have a particle size distribution such that 70 percent by weight thereof consisted of particles smaller than 2 microns equivalent spherical diameter. A quantity of tetrasodium pyrophosphate dispersing agent, equivalent to 0.15 percent by weight based on the weight of dry chalk whiting, was then added to the suspension with stirring and the resultant suspension was identified as $W_1$.

A second suspension was prepared from the same raw natural chalk whiting in an identical manner to that described above except that, instead of the addition of tetrasodium pyrophosphate dispersing agent, a second addition was made of the sodium polyacrylate dispersing agent amounting to 0.1 percent by weight based on the weight of dry chalk whiting, thus making a total dispersing agent addition of 0.2 percent by weight of sodium polyacrylate based on the weight of dry chalk whiting. This second chalk whiting suspension was identified as $W_2$.

A suspension of a fine kaolin clay having a particle size distribution such that 81 percent by weight thereof consisted of particles smaller than 2 microns equivalent spherical diameter was prepared by mixing 36.6 kg of dry kaolin clay in a tank with 19.5 liters of water containing sodium polyacrylate and tetrasodium pyrophosphate dispersing agents, and sufficient sodium hydroxide to give the liquor a final pH of about 7. The suspension contained 0.05 percent by weight of sodium polyacrylate dispersing agent and 0.25 percent by weight of tetrasodium pyrophosphate, based on the weight of dry kaolin clay, and the solids content of the suspension was 65 percent by weight. This suspension was identified as $C_1$.

A further suspension was prepared from the same fine kaolin clay in an identical manner except that no sodium polyacrylate dispersing agent was added and the quantity of tetrasodium pyrophosphate dispersing agent was 0.2 percent by weight based on the weight of dry kaolin clay. The final pH was again adjusted to about 7 with sodium hydroxide. This suspension was identified as $C_2$.

Each chalk whiting suspension was blended with each kaolin clay suspension in proportions such that the weight of dry chalk whiting present was equal to the weight of dry kaolin clay. The blending of the suspensions was achieved by mixing the two suspensions in a tank for about 10 minutes, during which time about 5 horsepower hours of energy per ton of solids were dissipated in the blended suspensions. The four blended suspensions comprised, respectively, $W_1 + C_1$, $W_1 + C_2$, $W_2 + C_1$ and $W_2 + C_2$, and each suspension contained 70 percent by weight of solids.

Samples of the four blended suspensions were tested for rheological stability by measuring their viscosities at 22° C. using a Brookfield Viscometer at speed 100 r.p.m. at 0, 2, 15, 24, 96 and 200 hours, respectively, after mixing. The results obtained are shown in table I below.

TABLE I

| Composition of suspension | Time (hours) | | | | | |
|---|---|---|---|---|---|---|
| | 0 | 2 | 15 | 24 | 96 | 200 |
| | Viscosity at 22° C. (centipoise) | | | | | |
| $W_1$ plus $C_1$ | 110 | 200 | 350 | 390 | 540 | 750 |
| $W_2$ plus $C_1$ | 300 | 600 | 815 | 840 | 820 | 660 |
| $W_1$ plus $C_2$ | 610 | 900 | 1,250 | 1,270 | 1,260 | 1,120 |
| $W_2$ plus $C_2$ | 1,170 | 1,380 | 1,610 | 1,630 | 1,630 | 1,630 |

These results show that the combination of either suspension $W_1$ or $W_2$ with suspension $C_1$, i.e. the combination in which the kaolin clay had been deflocculated with sodium polyacrylate and tetrasodium pyrophosphate, and the chalk whiting had been deflocculated with at least the sodium polyacrylate, gave the most stable blends.

The composition $W_1 + C_1$ was then diluted to 63 percent by weight of solids and dried in a conventional spray drier. The dried material was then divided into four portions A, B, C and D of which was mixed with water to form a suspension containing 70 percent by weight of solids. To portion A no extra deflocculant was added; to portion B there was added 0.10 percent by weight of sodium polyacrylate dispersing agent based on the weight of dry solids; to portion C there was added 0.15 percent by weight of tetrasodium pyrophosphate based on the weight of dry solids; and to portion D there were added 0.030 percent by weight of sodium polyacrylate dispersing agent and 0.045 percent by weight of tetrasodium pyrophosphate based on the weight of dry solids. The viscosities at 22° C. of the four suspensions at 0, 50, 100, 150 and 200 hours, respectively, after mixing were measured using a Brookfield Viscometer at speed 100 r.p.m. The results obtained are shown in table II below.

TABLE II

| Portion | Time (hours) | | | | |
|---|---|---|---|---|---|
| | 0 | 50 | 100 | 150 | 200 |
| | Viscosity at 22°C. (centipoise) | | | | |
| A | 280 | 1320 | 1490 | 1450 | 1360 |
| B | 240 | 680 | 760 | 820 | 850 |
| C | 190 | 830 | 890 | 870 | 860 |
| D | 180 | 450 | 560 | 580 | 600 |

These results show that the suspension with the best rheological properties for the purpose of forming, for example, a paper coating composition is obtained by adding small additional quantities of both sodium polyacrylate and tetrasodium pyrophosphate to the redispersed spray dried material.

EXAMPLE 2

The product manufactured by spray drying the blended suspension $W_1 + C_1$ was used as extender in an emulsion paint composition suitable for external use which had the following formulation:

| Ingredient | Parts by weight |
|---|---|
| Rutile (titanium dioxide) pigment | 160 |
| Spray dried $W_1 + C_1$ (1% water) pigment | 106 |
| Polyvinyl acetate copolymer (60% solids) | 252 |
| Dispersant (5% w/v solution) | 26.6 |
| Sodium benzoate (10% w/v solution) | 26.6 |
| Hydroxyethyl-cellulose (5% w/v solution) | 51.8 |
| Butyl cellosolve acetate | 2.5 |
| Fungicide | 2.5 |
| Defoaming agent | 1.0 |
| Water to 82 Krebs Units viscosity | |

The pigment volume concentration of the formulation was 40 percent. The dispersant consisted of a mixture of 5 parts by weight of sodium hexametaphosphate, 4 parts by weight of sodium hydroxide and 1 part by weight of sodium polyacrylate dispersing agent in a 5 percent w/v solution.

As a comparison a second emulsion paint composition was prepared in exactly the same way except that the kaolin/chalk whiting mixture was replaced by 104 parts by weight of a kaolin clay having a particle size distribution such that 50 percent by weight consisted of particles smaller than 2 microns equivalent spherical diameter, 10 percent by weight of particles larger than 10 microns equivalent spherical diameter and 0.01 percent by weight of particles larger than 53 microns (No. 300 mesh B.S. sieve).

Each composition was prepared by mixing the pigment and the extender with the dispersant, the fungicide and the defoaming agent for 2 minutes using a high-speed, shrouded impeller mixer. The hydroxy-ethyl-cellulose was then added and the composition mixed for a further minute. Finally the polyvinyl acetate copolymer and the butyl Cellosolve acetate were added and the composition mixed for another minute. The paints were allowed to stabilize overnight before their viscosity was adjusted to 82 Krebs units.

Each paint was tested for gloss at angles of 45° and 80° with the surface, opacity, brightness and brushability and flow, and the results are shown in table III below:

TABLE III

| | Kaolin | Kaolin chalk whiting mixture |
|---|---|---|
| Gloss : 45° | 2.1 | 2.2 |
| : 80° | 10.5 | 33.6 |
| Opacity | 86.9 | 87.5 |
| Brightness | 94.3 | 94.2 |
| Brushability and flow | fair | good |

The gloss measurement was obtained by applying a film of each paint 0.002 in. (0.05 mm.) in thickness with a draw bar applicator to a glass plate measuring 12 × 4 in. (305 × 102 mm.). The films were aged for 24 hours before readings were taken at the two angles of inclination using a gloss head coupled to a G.E.C. brightness meter.

The opacity measurement was made by drawing out a film of each paint of thickness 0.0032 in. (0.08 mm.) on a hiding power chart which was divided into black and white sections. The films were then allowed to dry overnight and reflectance measurements were taken in duplicate over the black and white portions of the charts. The apparatus used was a reflectometer head fitted with a neutral density filter and coupled to a G.E.C. brightness meter. The apparatus was set to read 100 percent when using a freshly scraped magnesium carbonate block as a standard. The average reflectance from the black and white portions were determined and the ratio:

$$\frac{\text{Average reflectance from the black portion}}{\text{Average reflectance from the white portion}} \times 100\%$$

was quoted as the opacity value.

The brightness measurement was made using the same charts and apparatus as the opacity measurement but the neutral density filter was replaced by a violet filter. The apparatus was again adjusted to give a scale reading of 100 when using the same magnesium carbonate block as a standard and the reflectance from the white portion of the chart was measured for each paint film.

I claim:

1. A mixed pigment consisting essentially of a clay pigment component and a calcium carbonate pigment component, said clay pigment component having associated therewith in the unmixed condition a quantity of a first dispersing agent which is a water-soluble condensed phosphate and a quantity of a second dispersing agent which is a water-soluble salt comprising an organic macromolecular anion, and said calcium carbonate pigment component having associated therewith in the unmixed condition a quantity of said second dispersing agent.

2. A mixed pigment as claimed in claim 1, wherein said calcium carbonate pigment component also has associated therewith in the unmixed condition a quantity of said first dispersing agent.

3. A mixed pigment as claimed in claim 1 wherein said first dispersing agent is selected from the group consisting of tetrasodium pyrophosphate, sodium hexametaphosphate and sodium tripolyphosphate.

4. A mixed pigment as claimed in claim 1, wherein said second dispersing agent is a water-soluble salt having a polymeric anion with a number average molecular weight in the range 100 to 10,000.

5. A mixed pigment as claimed in claim 4, wherein said second dispersing agent is selected from the group consisting of the sodium, potassium and ammonium salt of an acid selected from the group consisting of a polyacrylic acid and a polymethacrylic acid.

6. A mixed pigment as claimed in claim 1, wherein the amount of said first dispersing agent associated with the clay pigment component is in the range of from 0.1 to 0.5 percent by weight based on the weight of dry clay pigment.

7. A mixed pigment as claimed in claim 1, wherein the amount of said second dispersing agent associated with the clay pigment component is in the range of from 0.1 to 0.30 percent by weight based on the weight of dry clay pigment.

8. A mixed pigment as claimed in claim 1, wherein the amount of said second dispersing agent associated with the calcium carbonate pigment component is in the range of from 0.01 to 0.30 percent by weight based on the weight of dry calcium carbonate.

9. A mixed pigment as claimed in claim 1, wherein the calcium carbonate pigment component consists substantially completely of particles smaller than 53 microns.

10. A mixed pigment as claimed in claim 1, wherein the clay pigment component is a kaolinitic clay.

11. A mixed pigment as claimed in claim 10, wherein said clay pigment component has a particle size distribution such that at least 50 percent by weight thereof consists of particles smaller than 2 microns equivalent spherical diameter, not more than 15 percent by weight thereof consists of particles larger than 10 microns equivalent spherical diameter, and not more than 0.05 percent by weight thereof consists of particles larger than 53 microns.

12. A method of preparing a mixed pigment consisting essentially of a clay pigment component and a calcium carbonate pigment component said method comprising the steps of (a) forming an aqueous suspension of the clay pigment component containing a quantity of a first dispersing agent which is a water-soluble condensed phosphate and a quantity of a second dispersing agent which is a water-soluble salt comprising an organic macromolecular anion, (b) forming an aqueous suspension of the calcium carbonate pigment component containing a quantity of said second dispersing agent, and (c) blending together the aqueous suspension of the clay pigment component and of the calcium carbonate pigment component.

13. A method according to claim 12, wherein the solids contents of said aqueous suspension of a clay pigment component and said aqueous suspension of a calcium carbonate pigment component are such that the blended aqueous suspension has a solids content in the range 60 to 80 percent by weight.

14. A method according to claim 12, wherein after the aqueous suspensions of the clay pigment component and of the calcium carbonate pigment component have been blended together the resulting blending suspension is spray-dried.

15. A method according to claim 12, wherein said calcium carbonate pigment component has associated therewith before being mixed with said clay pigment component a quantity of said first dispersing agent.

16. A method according to claim 12, wherein the clay pigment component is a kaolinitic clay.

* * * * *